United States Patent [19]
Kuzma

[11] Patent Number: 5,832,506
[45] Date of Patent: Nov. 3, 1998

[54] DIRECTORY FOR NETWORK SERVERS

[75] Inventor: Andrew J. Kuzma, Portland, Oreg.

[73] Assignee: Intel Corporation, Santa Clara, Calif.

[21] Appl. No.: 625,057

[22] Filed: Mar. 29, 1996

[51] Int. Cl.$^6$ .................................................. G06F 17/30
[52] U.S. Cl. ........................... 707/200; 707/10; 707/100; 395/200.33; 395/200.44; 395/200.53; 395/200.68; 395/200.74
[58] Field of Search ............................ 707/10, 100, 200; 395/200.33, 200.48, 200.49, 200.53, 200.68, 200.74

[56] References Cited

U.S. PATENT DOCUMENTS

| | | | |
|---|---|---|---|
| 4,914,571 | 4/1990 | Baratz et al. | 707/10 |
| 5,377,191 | 12/1994 | Farrell et al. | 370/401 |
| 5,434,974 | 7/1995 | Loucks et al. | 707/101 |
| 5,483,652 | 1/1996 | Sudama et al. | 707/10 |
| 5,500,929 | 3/1996 | Dickinson . | |
| 5,539,881 | 7/1996 | Hunt et al. | 395/200.72 |

OTHER PUBLICATIONS

Benford, "Dynamic Definition of Entries and Attributes in the Directory Service", 8th International Conference on Distributed Computing Systems, 13–17 Jun. 1988, San Jose, California, pp. 563–568.

Sato et al., "Network Directory Concept for an Intelligent Network", GLOBECOM '89. IEEE Global Telecommunications Conference and Exhibition. Communications Technology for the 1990s and Beyond, 27–30 Nov. 1989, Dallas, Texas, pp. 851–855.

Hodson, A. E., "The Global Directory—An Overview", IEEE Colloquium on 'The Global Directory', 19 Apr. 1990, London, U.K., pp. 1/1–1/5.

Droms, R. E., "Access to Heterogeneous Directory Services", Proceedings IEEE INFOCOM '90, The Conference on Computer Communications. Ninth Annual Joint Conference of the IEEE Computer and Communication Societies. The Multiple Facets of Integration., 3–7 Jun. 1990, San Francisco pp. 1054–1061.

Hori et al., "WINDS—A Wide Area Directory Services For Network Management", Singapore ICCS '94 Conference Proceedings, vol. 2, 14–18 Nov. 1994, Singapore, pp. 805–809.

*Primary Examiner*—Paul R. Lintz
*Attorney, Agent, or Firm*—William H. Murray, Esq.; N. Stephan Kinsella, Esq.

[57] ABSTRACT

Providing a directory of servers on a computer network with a directory server. According to a preferred embodiment, the directory server stores records of servers registered with the directory server and provides information about the registered servers to a browsing user of the network. The directory server allows an unregistered network server to register with the directory server.

17 Claims, 4 Drawing Sheets

DIRECTORY FOR NETWORK SERVERS

BACKGROUND OF THE INVENTION

1. Field of the Invention

The present invention relates to the use of servers on computer networks.

2. Description of the Related Art

In computer network systems such as local-area networks ("LANs"), wide-area networks ("WANs"), and the Internet and the world-wide web ("WWW") which operates thereon, any number of servers may be established on nodes of the network. Thus, a number of users of a network may establish new servers which may be added to the network at arbitrary and unpredictable times.

Such servers are used for many purposes. For example, such servers may be WWW hyper text transport protocol ("HTTP") compatible servers that serve information through the use of web pages to browsers using other servers on the network. Web pages are built using the hyper-text markup language ("HTML"), which allows uniform resource locators ("URLs") to be embedded into the page script. URLs are unique addresses for servers or for web pages running on servers on the network, which provide a complete HTTP resource path, and thus serve as hypertext links that a brower of the page may select to access further web pages, perhaps on other servers of the WWW.

For one user of a server of a network to be able to access other servers of the network, the other servers' addresses, which are URLs, must be known. Unfortunately, in a decentralized network where new servers may be frequently and arbitrarily added, and as more and more individual users of the network establish servers (for instance, each employee of a company having an internal network may establish a separate desktop server to provide a web page for that employee), it becomes difficult to provide continually updated, consistent, and accurate information about existing servers and their addresses to all servers of the network.

There is, therefore, a need for establishing an updatable and accessible directory of servers running on a network.

SUMMARY

There is provided herein a directory server, computer network, method, and storage medium for providing a directory of servers on the computer network. According to a preferred embodiment of the invention, a directory means of the directory server stores records of servers registered with the directory server and provides information about the registered servers to a browsing user of the network. An updating means of the directory server allows an unregistered network server to register with the directory server.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

System Hardware

Figure 1:
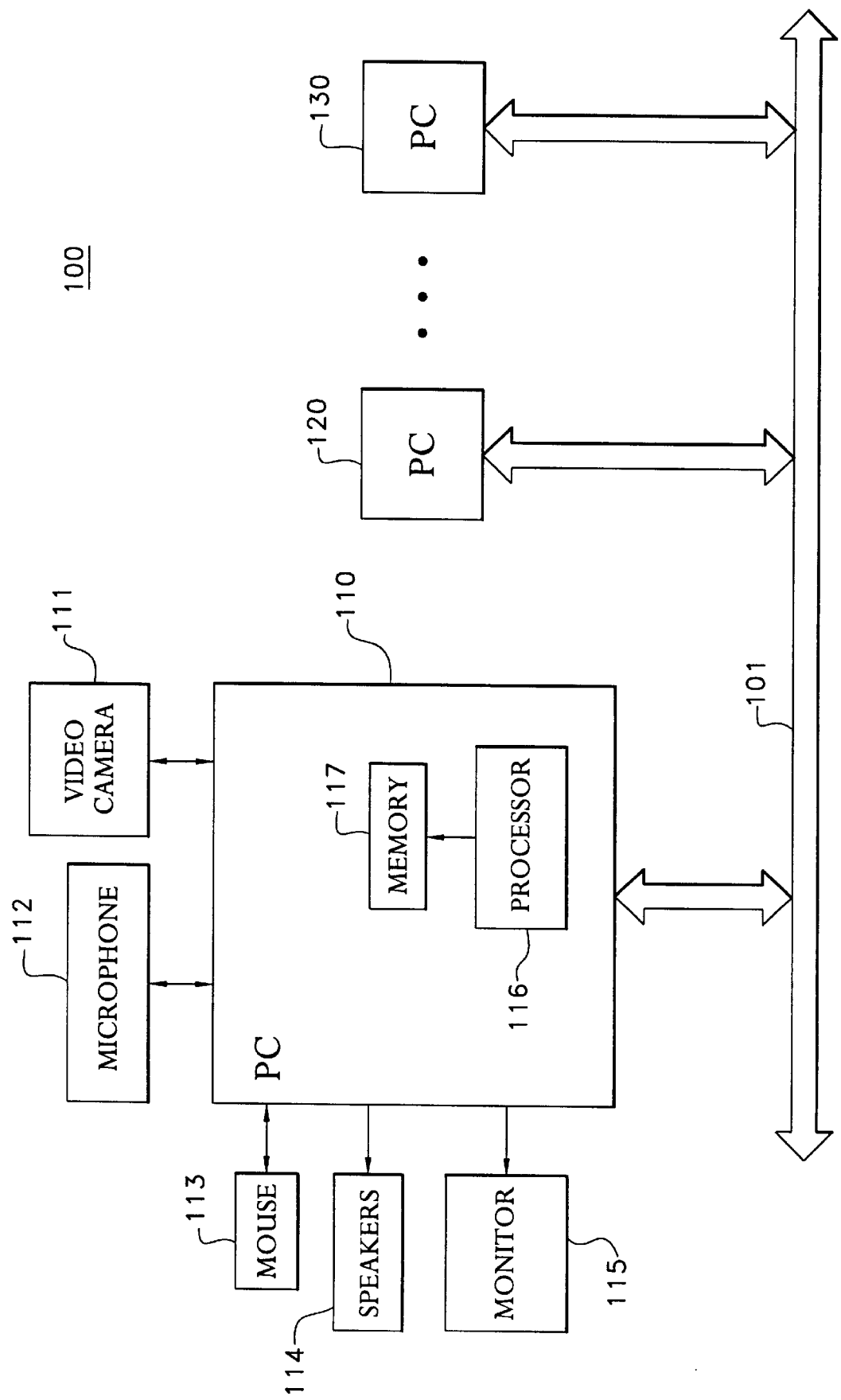
FIG. 1 shows a networked computer system in accordance with a preferred embodiment of the present invention.

Referring now to FIG. 1, there is shown networked computer system 100, in accordance with a preferred embodiment of the present invention. Networked computer system 100 comprises a plurality of nodes or personal computers ("PCs") 110, 120, 130. Personal computer or node 110 comprises a processor 116, memory 117, video camera 111, microphone 112, mouse 113, speakers 114, and monitor 115. PCs 110, 120, 130 may each run one or more desktop servers of an internal network within a given company, for instance, or may be servers of a general network not limited to a specific environment. For purposes of this application, it will be assumed that there is one server per PC node of the network, so that each PC node of the network represents a particular network server, having a particular network URL address. It is also assumed herein that each server defaults to a default web page for that server's user, which may itself contain embedded URLs pointing to further sub-pages of that user on that server, or to other servers or pages on other servers on the network.

Nodes 110, 120, 130 and other nodes of the network are interconnected via medium 101. Medium 101 may be, for example, a communication channel such as an Integrated Services Digital Network ("ISDN"). As will be understood, various nodes of a networked computer system may be connected through a variety of communication media, including local area networks ("LANs"), plain-old telephone lines ("POTS"), sometimes referred to as public switched telephone networks ("PSTN"), and the like. Various nodes of a network may also constitute computer system users interconnected via a network such as the Internet. As will be appreciated, each server on a network (running from a particular node of the network at a given instance) has a unique address or identification within the network, which may be specifiable in terms of an URL.

Often a multi-point data conferencing system may be supported by such a network. A plurality of multi-point conferencing units ("MCUs") may thus be utilized, as will be understood by those skilled in the art, to transmit data to and from various nodes or "endpoints" of the conferencing system. Nodes and/or MCUs may be interconnected via an ISDN link or through a local area network ("LAN"), in addition to various other communications media such as nodes connected through the internet. Those skilled in the art will appreciate that nodes of a conferencing system may, in general, be connected directly to the communications medium such as a LAN or through an MCU, and that a conferencing system may comprise other nodes or elements such as routers, servers, and the like.

Processor 116 is, in one embodiment, a general-purpose programmable processor, such as an Intel® Pentium™ processor. Those skilled in the art will also appreciate that processors of nodes of networked computer system 100 may also be a special-purpose video processor such as the Intel® 82750PB. As will be appreciated, the various peripherals and components of a node such as those of node 110 may vary from those of other nodes. Thus, node 120 and node 130 may be configured identically to or differently than node 110, as will also be understood. It will further be understood that a node may be implemented on any suitable computer system in addition to PC systems.

Figure 2:
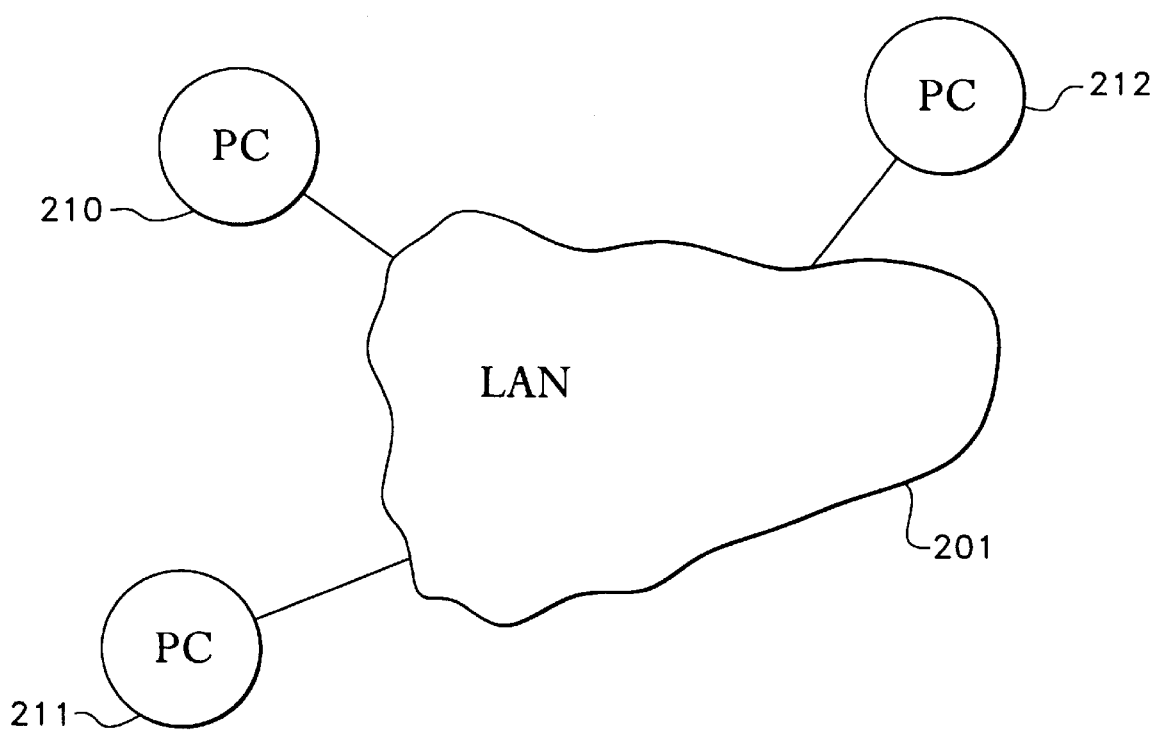
FIG. 2 depicts a second networked computer system in accordance with a preferred embodiment of the present invention.

Referring now to FIG. 2, there is shown a second networked computer system 200, in accordance with a preferred embodiment of the present invention. System 200 illustrates a network such as LAN 201, which may be used to interconnect a variety of nodes that may communicate with each other. Attached to LAN 201 are a plurality of nodes such as PC nodes 210, 211, 212. A node may also be connected to the LAN via a network server or other means (not shown). As will be appreciated, system 200 comprises other types of nodes or elements, for example including routers, servers, and nodes.

Figure 3:
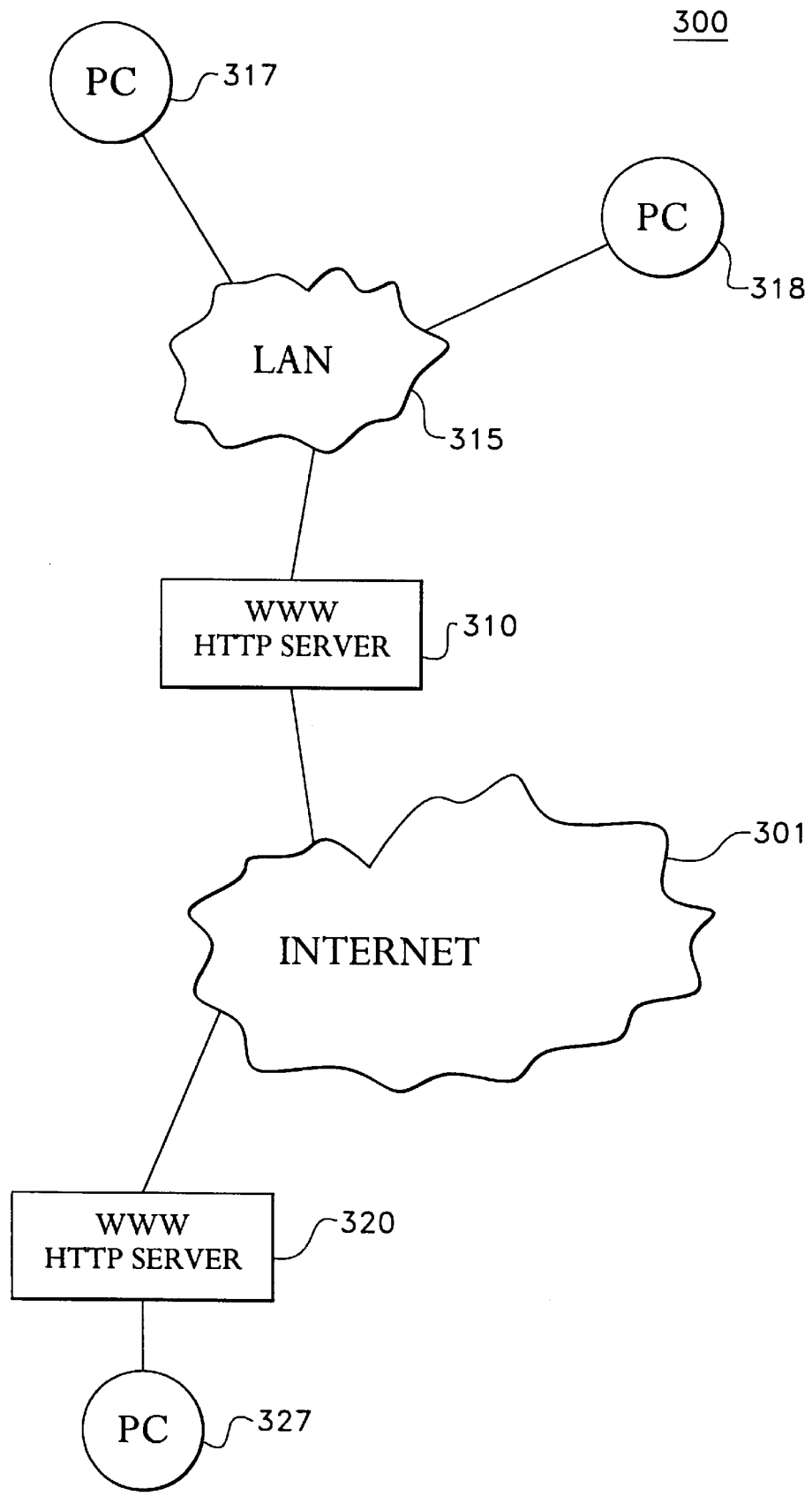
FIG. 3 illustrates a third networked computer system in accordance with a preferred embodiment of the present invention.

Referring now to FIG. 3, there is illustrated a third networked computer system 300, in accordance with a preferred embodiment of the present invention. System 300 illustrates a WWW system having communications across a backbone communications network such as Internet 301, which may be used to interconnect a variety of nodes of the network. As will be appreciated, the WWW is a set of protocols operating on top of the Internet, and allows a graphical interface system to operate thereon for accessing information through the Internet. Attached to Internet 301 in the WWW are a plurality of nodes such as PCs 317, 318, 327. Typically, a node is interfaced to other nodes of the WWW through a WWW HTTP server such as servers 310, 320. As will be understood, PC 327 may be a PC forming a node of network 301 and itself running its server 320, although PC 327 and server 320 are illustrated separately in FIG. 3 for illustrative purposes.

As will be understood, the WWW is a distributed type of application, characterized by the WWW HTTP, the WWW's protocol, which runs on top of the Internet's transmission control protocol/Internet protocol ("TCP/IP"). As will also be understood, the WWW may thus be characterized by a set of protocols (i.e., HTTP) running on the Internet as its "backbone."

A web browser is an application running on a node of a network that, in WWW-compatible type network systems, allows users of a particular server or node to view such information and thus allows the user to search graphical and text-based files that are linked together using hypertext links that are embedded in documents or files available from servers on the network that understand HTTP. As will be understood, when a given web page of a first server associated with a first node is retrieved by a user using another server on a network such as the Internet, the document retrieved may have various hypertext links embedded therein and a local copy of the page is created local to the retrieving user. Thus, when a user clicks on a hypertext link, the locally-stored information related to the selected hypertext link is typically sufficient to allow the user's machine to open a connection across the Internet to the server indicated by the hypertext link.

As will further be appreciated, more than one user may be coupled to each HTTP server, for example through a LAN such as LAN 315 as illustrated with respect to WWW HTTP server 310. System 300 may also comprise other types of nodes or elements.

As will be appreciated, a WWW HTTP server is an application running on a machine, such as a PC. Thus, each user may be considered to have a unique "server," as illustrated with respect to PC 327. Alternatively, a server may be considered to be a server such as WWW HTTP server 310, which provides access to the network for a LAN or plurality of nodes or plurality of LANs.

As described hereinabove, it will be assumed herein that there are a plurality of users, each having a desktop PC or node of a network, each desktop PC potentially establishing a server for the user thereof. Each server is associated with a particular network address or URL, which, when accessed, provides the default web page for that user. This web page may contain further links (embedded URLs) pointing to further sub-pages of that user on that server, or to other servers on the network or to pages on other servers on the network.

Autolink

Often a web page comprises a form with variables that may be entered by the browser. For example, user A may browse user B's web page, which contains blanks to enter information about or associated with user A. In previous techniques, a local instance of the web page form and its associated variables run on user A's computer, and, after user A enters information for various fields in the form, user A's computer sends the information back across the WWW to user B's server using its URL. This process is known as "posting" the supplied information on user B's server.

There is provided herein a method for automatically updating the contents of another user's web page that improves on the previous method of posting such information. According to one embodiment of the invention, a server having a page that is to be updatable by browsers also comprises an "autolink" means. Thus, a browser loads the web page containing variables that the browsing user can specify. After the browser supplies information for the various variable fields, the form is posted back to the server hosting the page. At this stage, the autolink automatically updates the page served by the server to include the received information. Thus, if the page is now re-loaded by the same browser or by other browsers, the page will have been modified to contain the information that was just supplied.

Thus, the autolink method can also be used to ease the authoring of documents, which may be referred to as "metadocuments," in which each section of the overall document are served off other machines. Using autolink, the metadocument author can leave an HTTP insertion point which can be revised at a later time. Without the ability of authors of subdocuments that are to be linked by the metadocument to modify the metadocument to link to the authors' subdocuments, the metadocument author would need to insert the subdocument URLs into the metadocument. This can be undesirable because the metadocument page author would need to know, a priori, the URL for many servers. As documents and information become more distributed, the logistics of managing such URLs can present difficulties in constructing distributed documents and related uses.

For example, suppose a team leader wants to publish a "Status Report." The team leader can create a "Status Report" metadocument page served off his desktop PC's server, that contains the URLs which point to status reports of each of the projects that are managed by a team member. Each such status report is a web page served off the desktop server of the individual responsible for that project. The team leader may be faced with a logistics problem of determining and correctly embedding the direct URL to each of projects. However, by implementing the autolink invention of the present application this problem may be reduced. The autolink method of the present invention is discussed in further detail below.

Referring once more to the above-discussed example, the "Status Page" is referred to as a metadocument. A metadocument in this usage is the organizational basis for a collection of information, in this case a collection of status report documents which are served from different desktop servers, none of which need to be the same server as the metadocument server, although some may be.

The metadocument author inserts a special URL called the autolink into the script. To use the autolink facility, or similar functionality, the metadocument containing a directory listing, as described in further detail below, should also contain HTML for the autolink so that the metadocument page can be modified. For example, on the directory page, the hypertext might say "To Register a New Web Server" and the associated URL to this hypertext could, in one embodiment, have the following form:

TABLE 1

<A HREF=/cgi-win/autolink.exe?c:\httpd\cgi-plcy\remhost\general.pol;liz;c:\httpd\htdocs\autotest.htm>John Jones</A>, where

| Component | Function |
|---|---|
| <A | HTML opening |
| HREF= | HTML hyperlink marking |
| /cgi-win/autolink.exe | relative link to the autolink CGI script to control the URL insertion |
| ?c:\httpd\cgi-plcy\remhost\general.pol | policy file |
| liz | metadocument URL insertion identifier |
| c:\httpd\htdocs\autotest.htm | file in which to insert new URL |
| > | HTML hyperlink closing |
| John Jones | hypertext |
| </A> | HTML closing |

As will be understood, a CGI script is a common gateway interface script. When a browser accesses an appropriate hypertext link available on a page of a server, a CGI script may be used to cause a process to be executed on the server. Thus, as will be appreciated, a CGI script allows a browsing user to tell the server to do something different than usual, such as returning an HTML form.

Thus, as will be appreciated, autolink provides for:
1. directing the request for modifying the metadocument; and
2. associating a policy for metadocument modification under the metadocument author's control.

With autolink, therefore, the metadocument can be published without the metadocument author knowing, a priori, the URLs of potential subdocuments or, for example, servers, and the metadocument can be modified without further intervention of the metadocument author. The autolink method of the present invention may be used advantageously in the server directory method and apparatus described hereinbelow.

Server Directory

As explained hereinabove, as servers of networks proliferate, it becomes difficult to keep track of existing servers over time. One advantage of large client/server systems such as some electronic mail ("e-mail") systems is that they provide a directory of the existing users. While such a directory may be quite large, keeping a copy of the directory on only a limited number of servers (such as "post-office" type servers) provides a consistent directory available to all the users.

In decentralized systems, however, where each desktop node of the network may arbitrarily establish one or more servers, there is no central directory on which new servers can be registered as they are deployed. There is, therefore, provided herein a means for providing such a central directory in a system that allows nodes to establish new servers at any time. Such a "metadirectory" may be sophisticated and may, in an embodiment, include a name-searching facility.

First, a central metadirectory is created on a special server at a published and therefor publicly known address. For example, in a system in which each user having a desktop PC may conceivably establish a server, such a metadirectory may be established, using WWW URL type language, at http://www.GreatChips.com/desktop.directory, where "GreatChips" is the company name. This metadirectory is a web page, which, in a preferred embodiment, contains an autolink URL as described hereinabove. The function of this autolink is to allow a browser to register his desktop server so that others within the network can have a standard method for finding this user.

Thus, consider a company with thousands of employees, each having a desktop PC with the ability to add a desktop server to the internal network, which is WWW-compatible. User Ayn Rand may wish to access user Murray Rothbard's server, but does not know if Rothbard has such a server. Instead of looking up Rothbard's phone number and calling Rothbard, to ask Rothbard to supply his actual URL (if one exists), Rand can access, from her own desktop PC, the metadirectory. From this metadirectory page she may be able, for example, to search alphabetically for "Rothbard, Murray" and be supplied with a link to Rothbard's server page, if it exists, which may then be instantly and easily accessed by Rand.

The metadirectory page also supplies an option to register one's own server information if one has not done so, for example if one has just established a new desktop server on the network. Thus, if Rand herself has not yet established her own server, she may do so. As part of the server installation process, the metadirectory may be updated to include information on Rand's server address. Alternatively, Rand may decide after having established a server to register with the metadirectory.

This may be done by accessing the metadirectory page and choosing the autolink URL on that page which supplies to Rand the form and variables needed, such as URL, name, and the like. This allows Rand to enter her information and have the metadirectory page automatically updated to indicate this. As will be understood, such data entry may be done semi-automatically by Rand's PC, for example by supplying an "address card" with information such as Rand's name, server URL, and the like. Thus, if Rothbard at a later point in time accesses the metadirectory page to see if Rand has a server, he will locate a hypertext link to her server.

Figure 4:
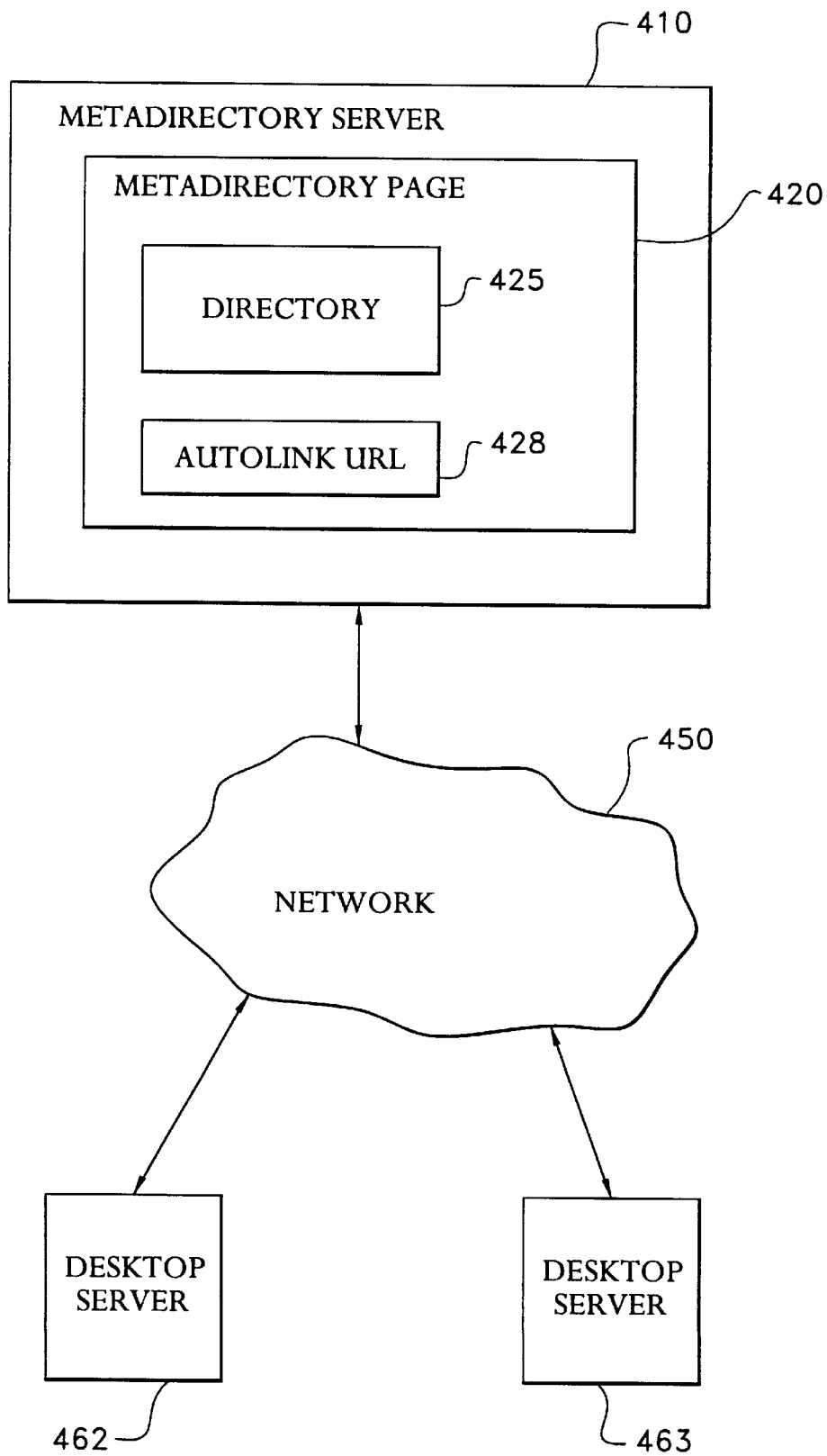
FIG. 4 shows a computer network with a metadirectory page server in accordance with a preferred embodiment of the present invention.

Referring now to FIG. 4, there is shown a computer network system 400 with a metadirectory page 420 server 410 in accordance with a preferred embodiment of the present invention. System 400 comprises a network 450 for interconnecting a plurality of servers such as desktop servers 462, 463, and server 410. As will be appreciated, the URL or address for metadirectory server 410 is well-known to users of network 450 by published or advertised information, for example. Server 410 hosts a metadirectory page 420, which is preferably defaulted to when a user such as the user of desktop server 462 browses server 410. Metadirectory page 420 comprises directory portion 425 and autolink URL 428.

As will be appreciated, directory portion 425 allows a brower such as the user of desktop server 462 to look up or otherwise find information about current servers on network 450 that have been registered with metadirectory page 420. This page also comprises an autolink URL 428 which the user may click on to be provided, as described above, with the necessary form to fill out to register on the metadirectory page. After filling in this information, the information is posted back to metadirectory server 410, where by use of autolink as described above the information is automatically added to the database of directory 425. Thus, when subsequent users load metadirectory page 420 by accessing metadirectory server 410, information concerning desktop server 462 and its associated user will be locatable using directory 425.

As will be understood, for local or internal networks that are limited to a certain number of users, for example employees of a company, if the internal network is connected to other networks such as the WWW, various techniques such as firewalls may be utilized to restrict access to the metadirectory to internal users of the network. Alternatively, such a metadirectory may be used without restriction on networks of any size.

As will be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer or by a distributed network of computers, the computer or network becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A directory server for providing a directory of servers on a computer network, comprising:
   (a) directory means for storing records of servers registered with the directory server and for providing information about the registered servers to a browsing user of the network; and
   (b) updating means for allowing an unregistered network server to register with the directory server, wherein the directory means and the updating means are accessible from a directory page served by the directory server.

2. The directory server of claim 1, wherein the directory means comprises means for searching stored records by a name of a user of the computer network to provide information about a registered server associated with the user if the server has been registered with the directory server.

3. The directory server of claim 1, wherein the directory server is located at a publicly-known address on the computer network.

4. The directory server of claim 1, wherein the updating means comprises an autolink means comprising:
   (1) means for providing to the unregistered network server a form having variables related to relevant information about the unregistered network server; and
   (2) means for automatically updating the records stored by the directory means to register the unregistered network server when the unregistered network server posts the form back to the directory server.

5. A method for providing a directory of servers on a computer network, the method comprising the steps of:
   (a) providing a directory server having a directory means and an updating means, wherein the directory means and the updating means are accessible from a directory page served by the directory server;
   (b) storing, with the directory means, records of servers registered with the directory server;
   (c) providing information with the directory means about the registered servers to a browsing user of the network upon request by the browsing user; and
   (d) allowing, with the updating means, an unregistered network server to register with the directory server.

6. The method of claim 5, wherein step (c) comprises the steps of:
   (1) searching stored records by a name of a user of the computer network; and
   (2) providing, in accordance with the search of step (c)(1), information about a registered server associated with the user if the server has been registered with the directory server.

7. The method of claim 5, wherein the directory server is located at a publicly-known address on the computer network.

8. The method of claim 5, wherein:
   the updating means comprises an autolink means; and
   step (d) comprises the steps of:
   (1) providing, with the autolink means, to the unregistered network server a form having variables related to relevant information about the unregistered network server; and
   (2) automatically updating, with the autolink means, the records stored by the directory means to register the unregistered network server when the unregistered network server posts the form back to the directory server.

9. A storage medium having stored thereon a plurality of instructions for providing a directory of servers on a computer network, wherein the plurality of instructions, when executed by a processor of a computer of the network, cause the computer to perform the steps of:
   (a) providing a directory server having a directory means and an updating means, wherein the directory means and the updating means are accessible from a directory page served by the directory server;
   (b) storing, with the directory means, records of servers registered with the directory server;
   (c) providing information with the directory means about the registered servers to a browsing user of the network upon request by the browsing user; and
   (d) allowing, with the updating means, an unregistered network server to register with the directory server.

10. The storage medium of claim 9, wherein step (c) comprises the steps of:
    (1) searching stored records by a name of a user of the computer network; and
    (2) providing, in accordance with the searching of step (c)(1), information about a registered server associated with the user if the server has been registered with the directory server.

11. The storage medium of claim 9, wherein the directory server is located at a publicly-known address on the computer network.

12. The storage medium of claim 9, wherein:
    the updating means comprises an autolink means; and
    step (d) comprises the steps of:
    (1) providing, with the autolink means, to the unregistered network server a form having variables related to relevant information about the unregistered network server; and (2) automatically updating, with the autolink means, the records stored by the directory means to register the unregistered network server when the unregistered network server posts the form back to the directory server.

13. A computer network, comprising:
(a) a plurality of interconnected computers having the capability to establish a network server; and
(b) a directory computer; wherein:
the directory computer provides a directory server having a directory, wherein the directory is accessible from a directory page served by the directory server;
the directory computer stores, in the directory, records of servers registered with the directory server;
the directory computer provides information, stored in the directory, about the registered servers to a browsing user of the network upon request by the browsing user; and
the directory computer allows an unregistered network server to register with the directory server.

14. The computer network of claim 13, wherein the computer provides the information by searching stored records by a name of a user of the computer network and by providing, in accordance with the searching, information about a registered server associated with the user if the server has been registered with the directory server.

15. The computer network of claim 13, wherein the directory server is located at a publicly-known address on the computer network.

16. The computer network of claim 13, wherein the directory computer allows the unregistered network server to register with the directory server by providing to the unregistered network server a form having variables related to relevant information about the unregistered network server and by automatically updating the records stored in the directory to register the unregistered network server when the unregistered network server posts the form back to the directory server.

17. A directory server for providing a directory of servers on a computer network, comprising:
(a) directory means for storing records of servers registered with the directory server and for providing information about the registered servers to a browsing user of the network; and
(b) updating means for allowing an unregistered network server to register with the directory server, the updating means comprising:
(1) means for providing to the unregistered network server a form having variables related to relevant information about the unregistered network server; and
(2) means for automatically updating the records stored by the directory means to register the unregistered network server when the unregistered network server posts the form back to the directory server.

* * * * *